Oct. 30, 1928.

A. N. EDEBURN 1,689,944

SIDE CHAIN LOCK

Filed June 14, 1926

Inventor
Alfred N. Edeburn
By Brockett + Hyde
Attorneys

Patented Oct. 30, 1928.

1,689,944

UNITED STATES PATENT OFFICE.

ALFRED N. EDEBURN, OF CLEVELAND, OHIO, ASSIGNOR TO THE CHAIN PRODUCTS COMPANY, OF CLEVELAND, OHIO, A CORPORATION OF OHIO.

SIDE-CHAIN LOCK.

Application filed June 14, 1926. Serial No. 115,977.

This invention relates to manually actuable chain locks or securing links of a type particularly applicable for employment in antiskid tire devices for the purpose of removably securing such devices in operative position upon the tire.

Customarily an anti-skid device of the type to which reference is made consists of two side or longitudinal chains of length approximately of the circumference of the rim of the tire, connected at intervals by short transverse members of sufficient length to extend laterally around the tire between the side chains circumferentially positioned on either side thereof. One end of each of the side chains carries a fastening device, or generally speaking a side chain lock, whereby after placing the anti-skid device in position upon the tire, by connecting the ends of the side chains, the whole, though free to move circumferentially upon the tire is secured against accidental removal therefrom until disengagement of the side chain locks.

Objects of this invention are to produce a side chain lock rugged in construction, simpler in operation than devices for the purposes have heretofore been, perfectly secure against unintended unlocking, and exceedingly inexpensive to manufacture.

Figure 1:
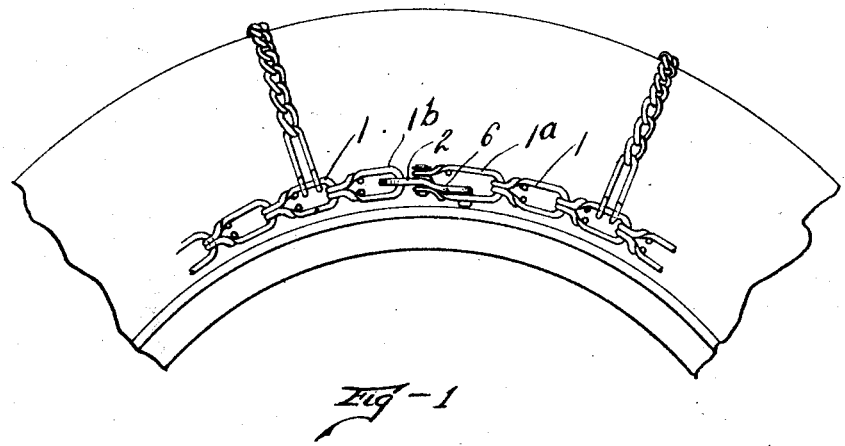
Figure 2:
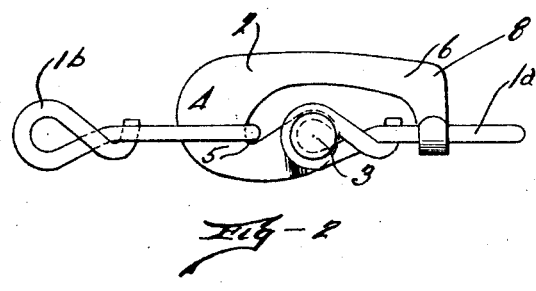
Figure 3:
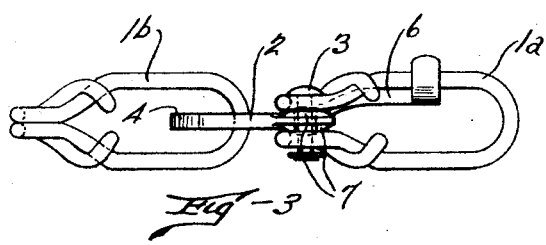
Figure 4:
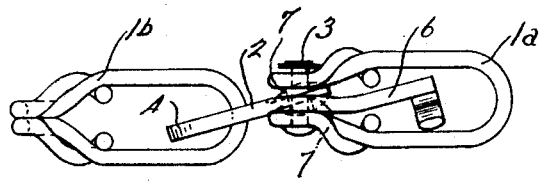
Figure 5:
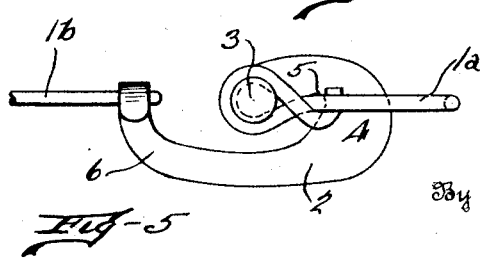

The exact manner of accomplishing these objects and the advantages resulting therefrom will be evident from the following detailed description of the invention taken in connection with the accompanying drawings in which Fig. 1 shows a portion of a pneumatic automobile tire with a corresponding section of a typical anti-skid chain secured thereon by a side chain lock embodying my invention; Fig. 2 is a detailed view of the two end links of one of the side chains secured by my lock; Fig. 3 is a corresponding view of the parts shown in Fig. 2, but at right angles thereto; Fig. 4 is a view similar to that of Fig. 3 but showing the lock in position to be opened; and Fig. 5 shows the same parts, in attached position of the chain ends but before locking.

The side chain links 1 shown in the drawings are of a type in common use in such devices, and are formed symmetrically, each of a piece of spring wire bent to form an eye as shown, the ends of the wire being brought together, bent back to form a pair of adjacent aligned eyes and hooked around the sides of the loop first referred to, all in a manner well known in the art and indicated in the drawings.

The chain lock comprises two principal members, the locking member 2, which is secured with the end link $1^a$ by a pin member 3, in a manner to be described.

The locking member is generally hook shaped like a question mark, cut and bent to the shape indicated in the drawings and preferably comprises a piece of heavy sheet metal; and includes a connecting portion perforated to receive the pin 3 whereby it may be secured with the link $1^a$, a generally hook shaped depending or rearwardly extending portion 4 provided with a notch 5 to receive and closely position the opposite end link $1^b$, of the chain, and extending forwardly of the portion 4 an extension or finger 6 the end of which is bent to form a laterally engaging latch hook as shown in the drawings, adapted to engage a side of the link $1^a$. The outer curve of the finger 6 is extended to form somewhat of a corner 8, for the purpose to be described.

That portion of the locking member surrounding the perforation referred to is embossed or otherwise formed with corresponding generally convex surfaces 7 as indicated particularly in Figs. 3 and 4, and is positioned between the pair of eyes referred to in the link $1^a$, the link being spread as indicated to receive the locking member, the eyes seating upon the surfaces described due to the resilience of the link material.

The pin 3 may consist of a rivet as indicated, swaged at its headless end over a washer in the usual manner, whereby the locking member 2 is permanently secured with the locking member $1^a$, but free for pivotal movement therein about the pin; the longitudinal dimension of the pin being such however, as to allow spreading of the link $1^a$ to the position shown in Fig. 4. The convex seats upon the securing portion of the locking member 2 form generally with the link eyes a ball and socket arrangement, but the surfaces upon the securing portion being rather flattened than of actual spherical conformation, as indicated in Figs. 3 and 4, while allowing universal movement of the locking member with respect to the link, yet owing to the resilience of the link material tend to maintain the locking member in alignment in its normal or closed position, that of Fig. 3. Maintenance of this position is also aided by the hook upon the projection 6 of the locking member in engagement around the side of the link 1ª; and maintenance of this engagement of the hook in turn is aided by the position of the notch 5, which is out of alignment with the pin 3 and the locked end of the finger 6 so that tension in the side chain tending to separate the links 1ª and 1ᵇ will the more tend to tighten the hook upon the link 1ª.

Operation of the device is as follows:

Referring specifically merely to one of the side chains, manipulation of the other side chain and the cross chains being obvious and well known; after the side chain is stretched around the tire, the locking member 2 being in the open position shown in Fig. 5, the link 1ᵇ is hooked over the extension 6 of the lock, being retained in this position by the hook thereon pending adjustment of other portions of the anti-skid device.

To lock the chain the locking member 2 is then rotated about the pin 3 to the position of Fig. 4, this motion forcing the links 1ª and 1ᵇ together to tighten the same, the inner surface of the locking member acting as a cam upon the link 1ᵇ. As the locking member approaches the position of Fig. 4, its tendency owing to the resilience of the link 1ª acting upon the surfaces referred to, is to assume the position of Figs. 2 and 3. It is therefore necessary to force the locking member laterally by hand to the position indicated in Fig. 4 as the finger of the locking member passes through the eye of the link 1ª. This is easily accomplished by the thumb of the operator engaging the portion of the locking member adjacent the corner 8. As soon as closed sufficiently to allow the hook upon the extension 6 to clear the side of the link 1ª, the locking member is allowed to be returned laterally by the link resilience acting upon the convex surfaces of the locking member, and moved back to the position indicated in Figs. 3 and 4. When this has occurred, the hook being engaged with the link 1ª, tension on the chain tends to maintain the hook in this engagement and therefore to maintain the chain locked. Movement of the hook upon the extension 6 in clearing the side of the link 1ª beyond the necessary clearing position as the locking member is being secured would ordinarily be prevented by engagement of the extension with the tire itself (Fig. 1). However, such motion would be also limited by engagement of the extension with the adjacent end of the wire which forms the link 1ª.

To open the locking means and unlock the same for removal, the above described operations are performed in the reverse order. The hook upon the locking member is released from the link 1ª moved inwardly against the tension of the link to clear it, (Fig. 4) and swung outwardly back to the position of Fig. 5, whereupon the link 1ᵇ may be lifted from the securing member and the same is free.

What I claim is:

1. A tire side chain provided with fastening means at one end, said means including an end chain link of resilient material open at its ends and provided with two arms terminating in parallel and aligned eyes tending to move broadside into engagement by the resiliency of said arms, a pin passing through said eyes and provided with heads on its opposite ends permitting separation thereof, and a hook-shaped locking member having a long arm provided with a laterally extending locking member and a return short arm pivoted on said pin between said eyes, the long arm being of such length that when said member is turned back into locking position said locking member engages with and latches around one of the arms in said end link, in which position said eyes resiliently press broadside against opposite faces of the return arm, and said resilient link arms requiring cocking of the locking member on said pin to separate said link eyes for releasing said locking member.

2. A tire side chain provided with fastening means at one end, said means including an end chain link of resilient material open at its ends and provided with two arms terminating in parallel and aligned eyes, tending to move broadside into engagement by the resiliency of said arms, a pin passing through said eyes and provided with heads on its opposite ends permitting separation thereof, and a hook-shaped locking member having a long arm provided with a laterally extending locking member and a return short arm pivoted on said pin between said eyes and having convex eye engaging surfaces, the long arm being of such length that when said member is turned back into locking position said locking member engages with and latches around one of the arms in said end link, in which position said eyes resiliently press broadside against said surfaces of the return arm, and said resilient link arms requiring cocking of the locking member on said pin to separate said link eyes for releasing said locking member, and said surfaces being adapted to facilitate said cocking.

In testimony whereof I hereby affix my signature.

ALFRED N. EDEBURN.